US009338088B2

(12) United States Patent
Roskind

(10) Patent No.: US 9,338,088 B2
(45) Date of Patent: May 10, 2016

(54) COMMUNICATION PROTOCOL FOR MULTIPLEXING DATA STREAMS OVER UDP

(71) Applicant: Google Inc., Mountain View, CA (US)

(72) Inventor: James Anthony Roskind, Redwood City, CA (US)

(73) Assignee: Google Inc., Mountain View, CA (US)

( * ) Notice: Subject to any disclaimer, the term of this patent is extended or adjusted under 35 U.S.C. 154(b) by 197 days.

(21) Appl. No.: 13/858,869

(22) Filed: Apr. 8, 2013

(65) Prior Publication Data

US 2015/0200845 A1    Jul. 16, 2015

(51) Int. Cl.
*H04L 12/26* (2006.01)
*H04L 12/721* (2013.01)
*H04L 12/741* (2013.01)

(52) U.S. Cl.
CPC .............. *H04L 45/70* (2013.01); *H04L 45/74* (2013.01)

(58) Field of Classification Search
CPC ................................ H04L 45/70; H04L 45/74
USPC .......................... 370/241, 252; 709/206, 223
See application file for complete search history.

(56) References Cited

U.S. PATENT DOCUMENTS

| 7,877,480 | B2 * | 1/2011 | Wardrop ...................... 709/225 |
| 8,230,056 | B2 * | 7/2012 | Bishop et al. ................ 709/223 |
| 8,706,551 | B2 * | 4/2014 | Roetter ..................... 705/14.47 |
| 8,819,170 | B2 * | 8/2014 | Cohen et al. ................. 709/217 |
| 2003/0050980 | A1 * | 3/2003 | Dutta et al. .................... 709/205 |
| 2005/0273388 | A1 * | 12/2005 | Roetter ........................... 705/14 |
| 2009/0063476 | A1 * | 3/2009 | Dutta et al. ....................... 707/5 |
| 2009/0182842 | A1 * | 7/2009 | Dutta et al. ................... 709/218 |
| 2010/0070588 | A1 * | 3/2010 | Sinn et al. ..................... 709/206 |
| 2010/0241535 | A1 * | 9/2010 | Nightengale et al. ........... 705/30 |
| 2010/0251347 | A1 * | 9/2010 | Roskind ............................ 726/5 |
| 2011/0145383 | A1 * | 6/2011 | Bishop et al. ................. 709/223 |
| 2014/0108210 | A1 * | 4/2014 | Chelst et al. .................... 705/30 |

\* cited by examiner

*Primary Examiner* — Phuc Tran
(74) *Attorney, Agent, or Firm* — McDermott Will & Emery LLP

(57) ABSTRACT

Aspects of the subject technology relate to a method for identifying a data stream. In some implementations, the method can include steps for generating a first globally-unique identifier (GUID), associating the first GUID with a first data stream comprising a first plurality of data packets and sending each of the first plurality of data packets to a remote device. In certain aspects, the method can also include steps for receiving a second plurality of data packets from the remote device, wherein each of the second plurality of data packets comprises a second GUID and comparing the second GUID with the first GUID to determine if the second plurality of data packets is associated with the first data stream. Systems and machine-readable media are also provided.

20 Claims, 6 Drawing Sheets

COMMUNICATION PROTOCOL FOR MULTIPLEXING DATA STREAMS OVER UDP

BACKGROUND

The subject application relates to a UDP based communication protocol, and particularly, to a quick UDP Internet connection protocol (hereinafter "QUIC"), for multiplexing transport streams.

SUMMARY

In some aspects, the subject technology relates to a computer-implemented method for identifying a data stream. The method includes steps for generating a first globally-unique identifier (GUID), associating the first GUID with a first data stream including a first plurality of data packets and sending each of the first plurality of data packets to a remote device. In certain implementations, the method further includes steps for receiving a second plurality of data packets from the remote device, wherein each of the second plurality of data packets includes a second GUID and comparing the second GUID with the first GUID to determine if the second plurality of data packets is associated with the first data stream.

In other aspects, the subject technology relates to a system for identifying one or more data streams. The system includes one or more processors and a computer-readable medium including instructions stored therein, which when executed by the processors, cause the processors to perform operations including generating a first globally-unique identifier (GUID), wherein the first GUID includes a plurality of pseudo-randomly generated bits, associating the first GUID with a first data stream including a first plurality of packets and sending each of the first plurality of data packets to a remote device. In certain aspects, the operations further include receiving a second plurality of data packets from the remote device, wherein each of the second plurality of data packets includes a second GUID and comparing the second GUID with the first GUID to determine if the second plurality of data packets is associated with the first data stream.

In another aspect, the subject technology relates to a computer-readable storage medium including instructions stored therein, which when executed by a processor, cause the processor to perform operations including generating a first globally-unique identifier (GUID), wherein the GUID includes a plurality of pseudo-randomly generated bits, associating the first GUID with a first data stream including a plurality of packets and sending each of the first plurality of data packets to a remote device. In certain implementations, the operations further include receiving a second plurality of data packets from the remote device, wherein each of the second plurality of data packets includes a second GUID and comparing the second GUID with the first GUID to determine if the second plurality of data packets is associated with the first data stream.

In another aspect, the subject technology relates to a computer-implemented method for terminating a connection, including negotiating, with a remote device, agreement on a conditional event for signaling a connection closure with the remote device, identifying an occurrence of the conditional event and terminating a connection with the remote device in response to the occurrence of the conditional event.

In yet another aspect, the subject technology relates to a computer-implemented method for estimating a connection timeout period, including sending a first probe query to a remote device, wherein the first probe query includes a request for a first response from the remote device after a first time duration, determining, after the first time duration, if the first response has been received from the remote device and sending a second probe query to the remote device, wherein the second probe query includes a request for a second response from the remote device after a second time duration. In certain aspects, the method further includes steps for determining, after the second time duration, if the second response has been received from the remote device and estimating a timeout period for a connection with the remote device based on whether the first response and the second response were received.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative, and not restrictive in nature.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these specific details. In some instances, structures and components are shown in block diagram form in order to avoid obscuring the concepts of the subject technology.

Some conventional communication protocols (such as TCP) identify communication channels (transport streams)

using an internet protocol (IP) address and port identification. For example, a connection between two end-points (for example devices A and B), in a packet switched communication network such as the Internet, can identify traffic from one another based on IP address/port binding associations. As such, device A could identify inbound traffic from device B based on an IP address and/or port binding associated with device B.

One limitation of addressing data packets using IP address/port binding information is that connections can be interrupted if the IP address and/or port binding information for either endpoint were to change. Disruptions in the continuity of a device IP address can occur for a variety of reasons, such as the migration of a device from one Internet access point to another, or the dynamic reassignment of an IP address that occurs, for example, when a network interface associated with the device is reset. Port bindings can also migrate in a variety of circumstances, including, but not limited to, the resetting of port assignments of one or more network address translation (NAT) devices, such as, switches, routers and/or firewalls, etc.

Aspects of the subject technology address these issues by providing a way in which a connection between two end-points in a network can be identified using information other than IP address/port binding information. In some implementations, a QUIC communication protocol can be used to facilitate communication between end-points in a network whereby a globally unique identifier (GUID), is inserted into each packet in the corresponding data stream and used to identify the connection.

Although a GUID used to identify a particular connection can include any type of information or data that is inserted into packets associated with the connection, in certain implementations the GUID can include a pseudo-randomly generated series of bits.

Figure 1:
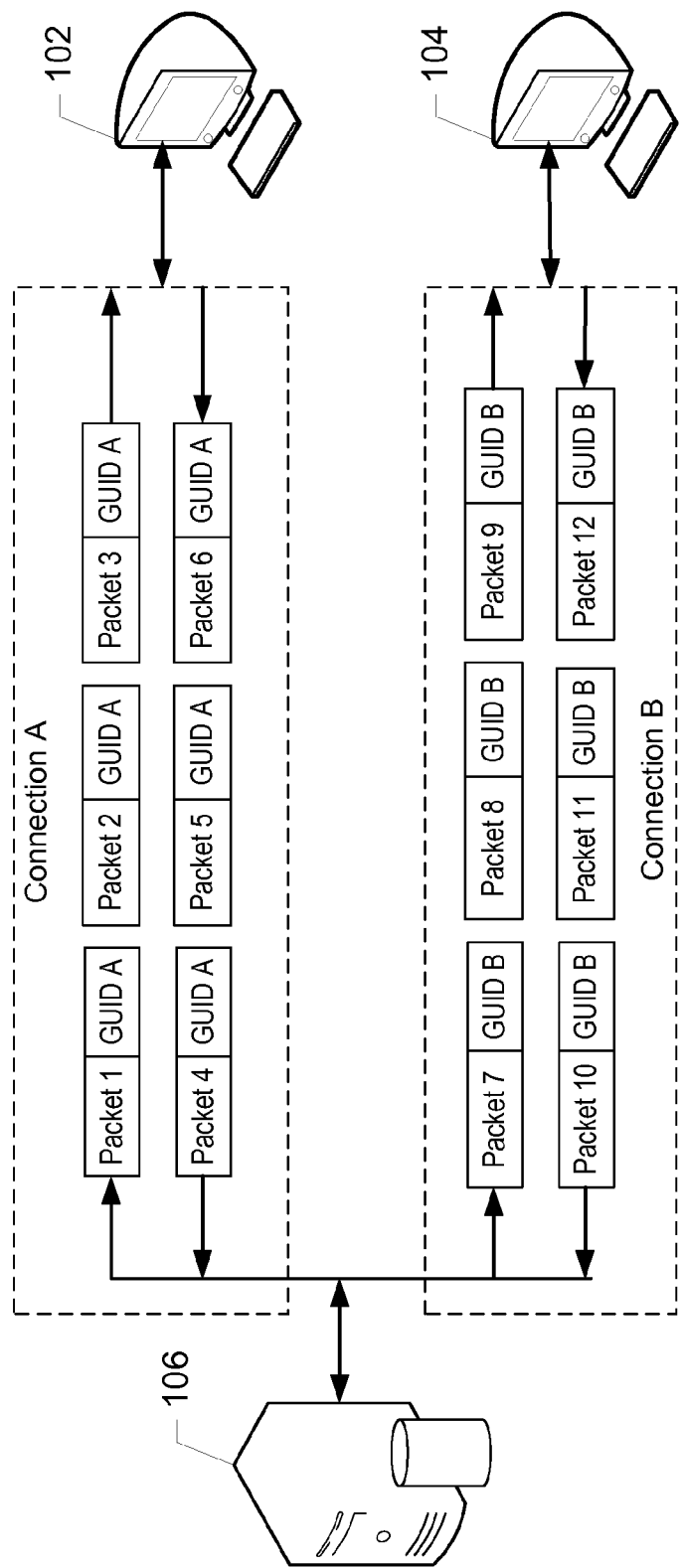
FIG. 1 is a block diagram that conceptually illustrates an example of a logical separation between two communication streams using a globally unique identifier, according to some aspects of the subject technology.

FIG. 1 is a block diagram that conceptually illustrates an example of a communication system 100 in which a logical separation between two connections is accomplished using a GUID. Communication system 100 includes first device 102, second device 104 and server 106. Each of the illustrated devices (e.g., first device 102 and second device 104) and server 106 are examples of processor-based devices configured to transact data over a packet switched communication network (not shown). However, first device 102, second device 104 and server 106 can represent any type of device configured to communicate over a network, including, but not limited to, personal computers, tablet computers, mobile devices (e.g., mobile phones, PDAs, etc.), and/or servers, etc. It is understood that aspects of the subject technology can be implemented using a different number of devices than that provided in the example of FIG. 1.

As illustrated, first device 102 communicates with server 106, using connection A that includes a plurality of packets, each associated with a common GUID. For example, connection A includes packets transmitted by server 106 to first device 102, including packet 1, packet 2 and packet 3, each of which are associated with GUID A. Similarly, connection A includes a plurality of packets en route from first device 102 to server 106, including packet 4, packet 5 and packet 6, also associated with GUID A. Communication system 100 also illustrates communication between second device 104 and server 106, using connection B, which includes packets 7-12 associated with GUID B.

Although the example of FIG. 1 illustrates server 106 as initiating connection A, it is understood that in other implementations, a client device, such as first device 102 may initiate a connection with server 106. In such cases, the client device (e.g., first device 102) can generate a pseudo-random GUID that is associated with the connection.

As discussed above, connection A and connection B can be identified by their respective GUID associations. As such, IP address and/or port binding information for either connection can change, without interrupting the ability of server 106 to distinguish between the connections. For example, if first device 102 were to migrate to a new IP address (and continue to send/receive data to/from server 106), the new IP address assignment of first device 102 would not frustrate the delivery of packets in connection A to first device 102, which are identifiable based on an association with GUID A.

Figure 2:
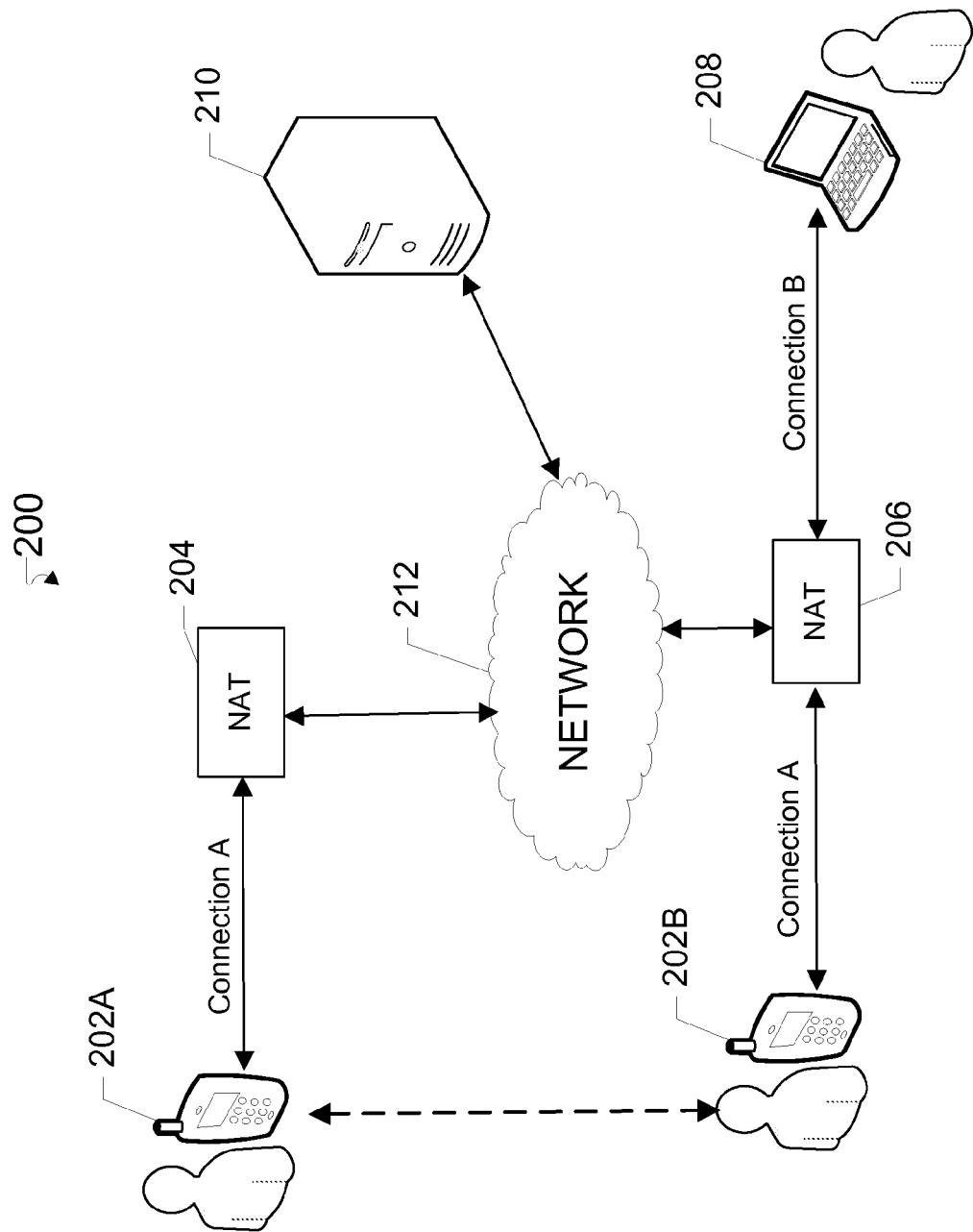
FIG. 2 illustrates an example of a network system in which certain aspects of the technology can be implemented.

An example of IP address/port binding migration by a mobile device is illustrated in FIG. 2, which depicts an example of a network system 200, in which aspects of the subject technology can be implemented. Network system 200 includes first user device 202 (shown at a first location 202A and a second location 202B), first network address translator (NAT) 204, second NAT 206, second user device 208, and server 210. Each of first user device 202, first NAT 204, second NAT 206, second user device 208 and server 210 are communicatively coupled via network 212.

It is understood that in addition to first user device 202, first NAT 204, second NAT 206, second user device 208 and server 210, any number of other processor-based devices could be communicatively connected to network 212. Furthermore, network 212 could comprise multiple networks, such as a network of networks, e.g., the Internet.

Aspects of the subject technology can be implemented using network system 200. For example, first user device 202A can be in communication with server 210, using connection A, as described above with respect to the example of FIG. 2. Connection A can be associated with an IP address and/or port binding assigned by first NAT 204, as well as a GUID for connection A (e.g., GUID A). Similarly, second user device 208 can be in communication with server 210 using connection B, and associated with a different IP address and/or port binding determined by second NAT 206, as well as a GUID for connection B (e.g., GUID B).

If the first user device 202A moves to a new position, for example that of first user device 202B, then connection A with server 210 is routed through second NAT 206, and associated with a new IP address and port binding as determined by NAT 206. Although data packets for connection A are associated with a different IP address/port binding, server 210 can identify the association with connection A, based on GUID A. As such, the GUID implementations of the subject technology can facilitate the seamless migration of a device between IP addresses and/or port mappings without the loss or interruption of connections with the device.

Figure 3:
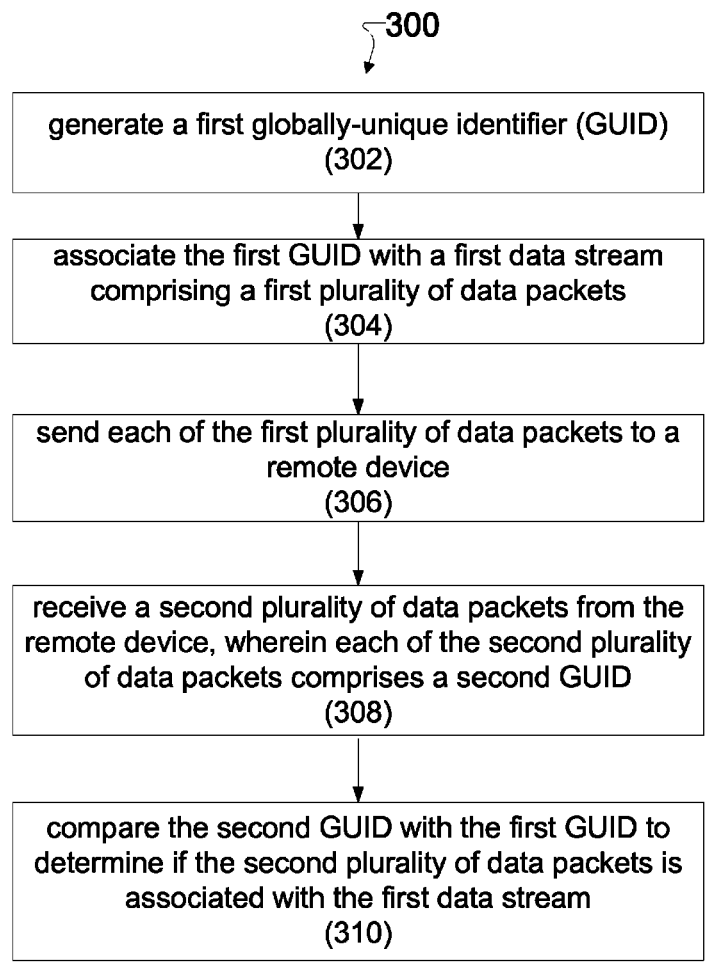
FIG. 3 illustrates steps of an example process for identifying connections using a GUID, according to certain aspects of the technology.

FIG. 3 illustrates steps of an example process 300 for identifying connections using a GUID, according to certain aspects of the technology. Process 300 begins with step 302 in which a first GUID is generated, for example, by a client device. As discussed above, a GUID (e.g., the first GUID) can include any information that can be used to uniquely identify a plurality of packets, for example, from one or more other pluralities of packets. In some implementations, the GUID can be pseudo-randomly generated.

In step 304, the first GUID is associated with a first data stream including a first plurality of data packets. The manner in which the first GUID is associated with the first data stream can vary by implementation; however, in certain aspects, the first GUID is associated with the first data stream by inserting the first GUID in each data packet associated with the first data stream. As such, the first GUID (e.g., an identical sequence of bits representing the first GUID) can be included in each data packet in the first plurality of data packets.

In step 306, each of the first plurality of data packets is sent (transmitted) to a remote device. The first plurality of data packets can be transmitted using a communication network (e.g., the Internet). Furthermore, the remote device can include any device capable of sending/receiving data packets over the communication network. By way of example, the remote device can include, but is not limited to, a server, personal computer, tablet computing device, or mobile device, such as a mobile phone or PDA, etc.

After the first plurality of data packets are received by the remote device, the remote device is informed that the connection with the client device is associated with the first GUID (e.g., as indicated by the first plurality of data packets). Subsequently, when data is transmitted by the remote device (e.g., a server) to the client device, the packets can be associated with a GUID that matches the first GUID.

In step 308, a second plurality of data packets is received by the client. Initially, the origin of the second plurality of packets, as well as their association with any open connection, may be unknown. Each of the second plurality of data packets can include a GUID (e.g., a second GUID). The second GUID can be the same (or different) from the first GUID and, as such, can identify packets for the same connection, or a different connection.

If the second GUID matches the first GUID, the client can infer that the second plurality of packets are associated with the first data stream, as discussed above with respect to step 306. In such a case, the second plurality of packets may be those received in response to the first plurality of originally transmitted packets. Alternatively, if the second GUID does not match the first GUID, the second plurality of packets may be associated with a different data stream.

Identification of the second plurality of data packets occurs in step 310, wherein the second GUID is compared with the first GUID to determine if the second plurality of packets is associated with the first data stream. As discussed above, if the second GUID is the same as the first GUID, the second plurality of packets is determined to be part of the first data stream. Alternatively, if the second GUID is different from the first GUID, the second plurality of packets is determined to belong to a different data stream, for example, for a different remote device than that associated with the first data stream.

In another aspect, the subject technology provides a way by which a transport stream (e.g., a connection) between end-points in a network can be implicitly dropped or torn down. Connection termination using conventional transport protocols (such as TCP) can be problematic for power sensitive applications. For example, for end-points using TCP, the establishment of a connection requires sending SYN packets (e.g., by a sender) and receiving SYN-ACK packets (e.g., from a receiver) before a sender-receiver connection is established. Additionally, in conventional protocols, connections between two devices can require an explicit announcement of the intent to tear down the connection, for example, by broadcasting a FIN packet. Explicit teardown is problematic for mobile devices, because mobile devices must often power-on dormant antennas/transceivers, only to receive a FIN packet indicating that a communicating device no longer wishes to continue the packet exchange.

Aspects of the subject technology address the above issue by providing a way by which devices can implicitly terminate a connection based on the occurrence of an agreed upon conditional event, such as the passage of a predetermined duration of time. Implicit connection teardown features of the subject technology can be implemented between communicating devices using the QUIC protocol, as discussed above.

Figure 4:
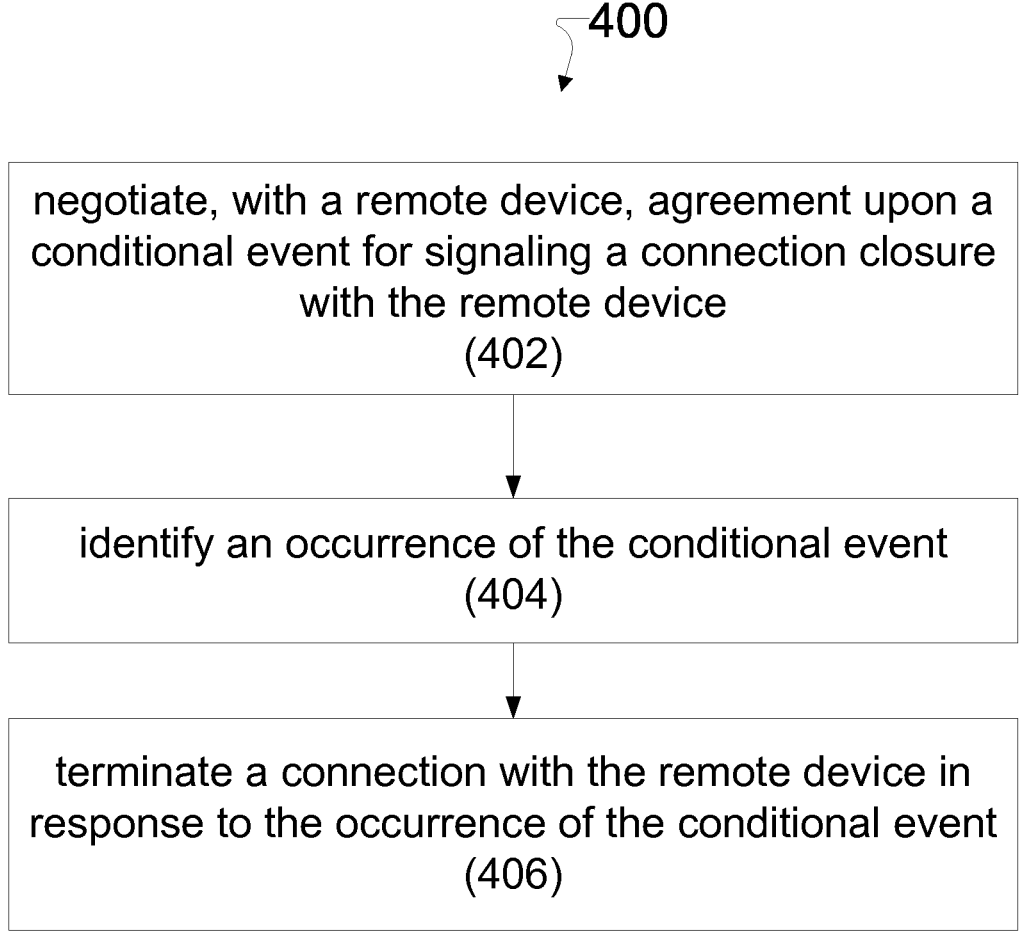
FIG. 4 illustrates steps of an example process for implementing an implicit connection teardown, according to certain aspects of the technology.

FIG. 4 illustrates steps of an example process 400 for implementing an implicit connection teardown, according to certain aspects of the technology. Process 400 begins with step 402 in which negotiation with a remote device is performed in order to reach agreement upon a conditional event for signaling a connection closure with the remote device. Referring to the illustration of network system 200 depicted with respect to FIG. 2, second user device 208 could negotiate, for example, with server 210, agreement on a condition upon which a connection between second user device 208 and server 210 (e.g., connection B) would be torn down.

The conditional event used to signal the termination of a connection can be any event/condition that can be known by both devices supporting the connection (e.g., second user device 208 and server 210). In some implementations, the implicit teardown condition may be the lapse of a predetermined duration of time, such as five minutes, or fifteen minutes. Alternatively, the condition may be based on the occurrence (or no occurrence) of events, such as the absence of packet exchange for a given duration of time.

In step 404, an occurrence of the conditional event negotiated in step 402 is identified. Subsequently, in step 406, a connection with the remote device is terminated in response to the occurrence of the conditional event. By way of example, second user device 208 and server 210 may agree that connection B will be terminated if no packet exchange between the devices occurs for longer than ten minutes. As such, connection B can be implicitly terminated after ten minutes of inactivity, without sending an explicit teardown signal (e.g., a FIN packet). By implicitly terminating its connection with server 210, second user device 208 can avoid the need to power on antennas and/or transceivers to receive an explicit teardown message.

Additionally, in certain aspects, the subject technology can provide a way in which a secure connection termination (teardown) message can be broadcast between communicating devices. Secure teardown messages are desirable where there is concern that malicious termination messages may cause connection interruptions (e.g., the great firewall of China). For example, a connection between two TCP end-points can be maliciously terminated by a third-party by broadcasting false FIN packets to one (or both) of the end-points when no termination is desired. By providing a way to securely signal a connection teardown, aspects of the subject technology can help mitigate the risk of malicious connection termination.

In some implementations, a secure connection termination message can be generated using a GUID associated with a QUIC based connection, as discussed above. The secure connection termination message can include a keyed-hash of a message or instruction based on the GUID for the corresponding connection. In such implementations, it would be necessary for a malicious third-party to ascertain the hashing algorithm (and key) in order to produce a false termination message.

Further to the example provided with respect to FIG. 2, first user device 202A can communicate with server 210 via an open connection (such as connection A), over network 212. To terminate connection A, first user device 202A and/or server 210 would need to indicate intent to terminate the connection by broadcasting a termination message to the other device. The termination message can be based on a secure hash of the GUID associated with connection A (e.g., GUID A). As such, a malicious device (e.g., second user device 208) would be unable to (successfully) generate a false termination message, without knowing an algorithm used to produce the secure hash for GUID A. Such implementations provide an additional layer of security to thwart potential malicious teardown events that are carried out using unauthenticated termination messages, such as false FIN packets.

Another aspect of the subject technology provides a way in which two end-points can determine a NAT timeout of a port mapping, for example, for one or more intermediary devices (e.g., NATs or "middle boxes") in a communication path. Unknown port timeout periods can be problematic because after a port binding times out the binding is discarded, potentially disrupting the associated connection, as discussed above.

By knowing the approximate timeout period (e.g., for one or more NAT devices in the communication path), end-points can communicate at minimal time intervals required to keep the relevant NAT devices from unbinding port associations for the respective connection. In certain aspects, a NAT timeout for a port mapping is determined by a client and server through the exchange of probing messages for different time-reply intervals. For example, two end-points may propose a timeout duration and one device (e.g., a server) can send a probe message to the other device (e.g., a client) after the proposed duration. If the probe message is received by the client, it may be determined that the proposed timeout duration was too short. Alternatively, if the probe message is not received, it may be determined that the proposed timeout duration was too long. Through repeated experimentation (e.g., probing and adjusting of the proposed timeout delay), the NAT timeout period can be estimated/approximated.

Figure 5:
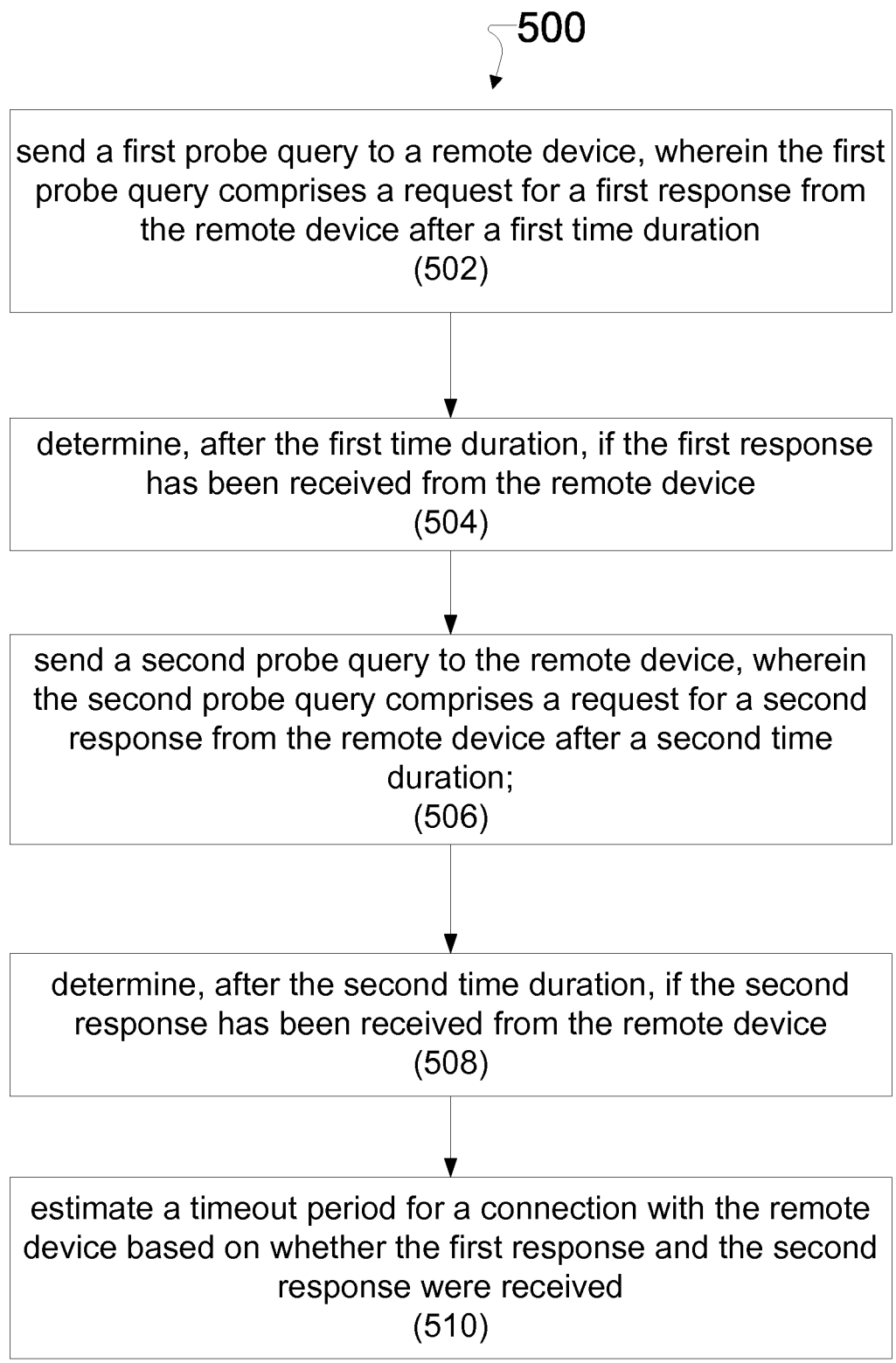
FIG. 5 illustrates steps of an example process for estimating a connection timeout period, according to certain aspects of the technology.

FIG. 5 illustrates steps of an example process 500 for estimating a connection timeout period, according to certain aspects of the technology. Process 500 begins with step 502 in which a first probe query is sent to a remote device, wherein the first probe query includes a request for a first response from the remote device after a first time duration.

The request of the probe query (e.g., the first request of the first probe query) includes a request that the recipient (e.g., the remote device) return a reply after a certain time duration. The receipt/non-receipt of the reply can be used to determine whether a port binding (e.g., of one or more middle boxes or NATs) in the connection path has timed out. If a port binding for the connection is discarded within the first time duration, a reply from the remote device may not be received. Alternatively, if a reply is received from the remote device, the timeout period for the middle boxes/NATs may be longer than the first time duration. Thus, the receipt (or non receipt) of a reply from the remote device can provide an indication of the port timeout period for the corresponding connection.

In certain aspects, the first time duration (e.g., set by a transmitter) can be an estimation of a timeout period for port bindings in the associated connection. The estimation may be a random estimation made, for example, within a bounded time period. Alternatively, the length of time associated with the first time duration may be initially estimated based on information known for one or more NATs in the connection path, such as, default port binding timeout periods, etc.

In step 504, it is determined, after the first time duration, if the first response has been received from the remote device. If the first response is not received, it may be inferred that the first time duration is larger (longer) than the time period set for a port timeout. Alternatively, if the first response is received, it may be inferred that the first time duration is shorter than the time period set for a port timeout.

In step 506, a second probe query is sent to the remote device, wherein the second probe query includes a request for a second response from the remote device after a second time duration. In some aspects, the second time duration can be based on a determination of whether or not the first response was received. By way of example, if the first response was received, then the second time duration may be calibrated to be larger than that of the first time duration. Alternatively, if the first response is not received, the second time duration can be calibrated to be smaller than that of the first time duration.

In step 508, it is determined, after the second time duration, if the second response has been received from the remote device. Subsequently in step 510, a timeout period for a connection with the remote device is estimated, based on whether the first response and the second response were received.

Referring again to FIG. 2, the port binding timeout for first NAT 204 may be unknown to first user device 202A and set for ten minutes. Thus, after ten minutes, a port binding associated with connection A is discarded. In accordance with the subject technology, first user device 202A can send a first probe query to server 210, including a request for a first response after a first time duration of five minutes. After five minutes, first user device 202A may receive the first response, providing evidence that the timeout period for first NAT 205 is greater than five minutes.

Subsequently, first user device 202A can send a second probe query to server 210, including a second response request after a second time duration of twelve minutes. Because twelve minutes is longer than the actual timeout period for first NAT 204 (e.g., of ten minutes), the second response is not received from server 210. As such, the first user device 202A may estimate the port timeout period for first NAT 204 to be greater than five, but less than twelve minutes. As such, a minimum amount of packet exchange between first user device 202A and server 210 can be maintained, to keep connection A from becoming unbound. By more accurately knowing the port timeout period of middle boxes in the communication path of connection A, first user device 202A and server 210 can more efficiently time the exchange data packets, for example, to keep the connection from coming unbound while avoiding the unnecessary transmission of data packets at small time intervals.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 6:
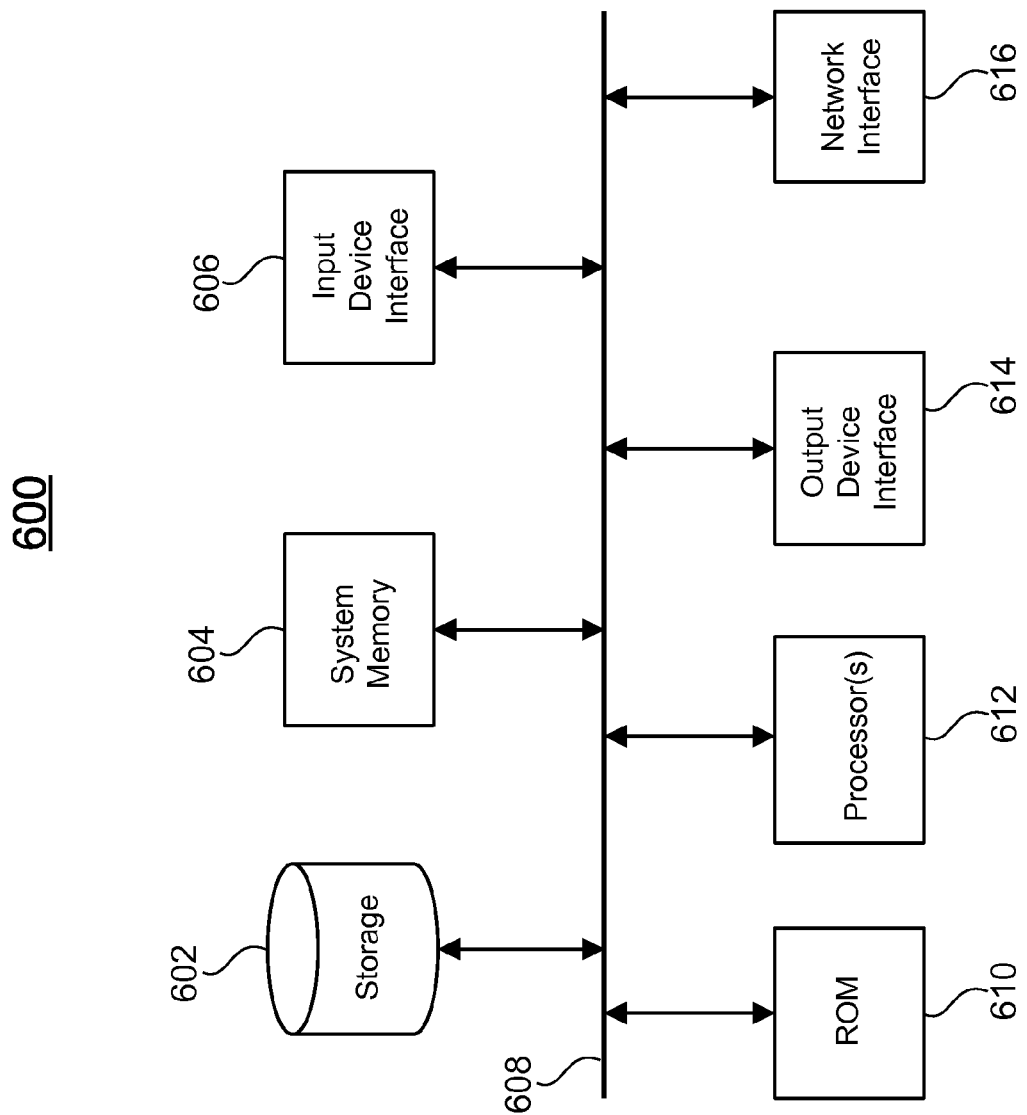
FIG. 6 illustrates an example of an electronic system with which some aspects of the subject technology can be implemented.

FIG. 6 conceptually illustrates an electronic system 500 with which some implementations of the subject technology are implemented. Electronic system 600 can be a computer, phone, PDA, or any other sort of processor-based electronic device. Such an electronic system can include various types of computer readable media and interfaces for various other types of computer readable media. Electronic system 600 includes bus 608, processing unit(s) 612, system memory 604, read-only memory (ROM) 610, storage device 602, input device interface 614, output device interface 606, and network interface 616.

Bus 608 collectively represents all system, peripheral, and chipset buses that communicatively connect the numerous internal devices of electronic system 600. For instance, bus 608 communicatively connects processing unit(s) 612 with ROM 610, system memory 604, and storage device 602.

From these various memory units, processing unit(s) 612 retrieves instructions to execute and data to process in order to execute the processes of the subject disclosure. The processing unit(s) can be a single processor or a multi-core processor in different implementations.

ROM 610 stores static data and instructions that are needed by processing unit(s) 612 and other modules of the electronic system. Storage device 602, on the other hand, is a read-and-write memory device. This device is a non-volatile memory unit that stores instructions and data even when electronic system 600 is off. Some implementations of the subject disclosure use a mass-storage device (such as a magnetic or optical disk and its corresponding disk drive) as storage device 602.

Other implementations use a removable storage device (such as a floppy disk, flash drive, and its corresponding disk drive) as storage device 602. Like storage device 602, system memory 604 is a read-and-write memory device. However, unlike storage device 602, system memory 604 is a volatile read-and-write memory, such a random access memory. System memory 604 stores some of the instructions and data that the processor needs at runtime. In some implementations, the processes of the subject disclosure are stored in system memory 604, storage device 602, and/or ROM 610. For example, the various memory units include instructions for conducting experiments in accordance with some implementations. From these various memory units, processing unit(s) 612 retrieves instructions to execute and data to process in order to execute the processes of some implementations.

Bus 608 also connects to input and output device interfaces 614 and 606. Input device interface 614 enables the user to communicate information and select commands to the electronic system. Input devices used with input device interface 614 include, for example, alphanumeric keyboards and pointing devices (also called "cursor control devices"). Output device interfaces 606 enables, for example, the display of images generated by the electronic system 600. Output devices used with output device interface 606 include, for example, printers and display devices, such as cathode ray tubes (CRT) or liquid crystal displays (LCD). Some implementations include devices such as a touch-screen that functions as both input and output devices.

Finally, as shown in FIG. 5, bus 608 also couples electronic system 600 to a network (not shown) through network interface 616. In this manner, the computer can be a part of a network of computers (such as a local area network ("LAN"), a wide area network ("WAN"), or an Intranet, or a network of networks, such as the Internet. Any or all components of electronic system 600 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method for identifying a data stream, comprising:
    generating a first globally-unique identifier (GUID);
    associating the first GUID with a first data stream comprising a first plurality of data packets;
    sending each of the first plurality of data packets to a remote device;
    receiving a second plurality of data packets from the remote device, wherein each of the second plurality of data packets comprises a second GUID;
    comparing the second GUID with the first GUID to determine if the second plurality of data packets is associated with the first data stream; and
    associating the second plurality of data packets with a second data stream, different from the first data stream, if the second GUID is different from the first GUID.

2. The computer-implemented method of claim 1, wherein the first GUID comprises a plurality of pseudo-randomly generated bits.

3. The computer-implemented method of claim 1, further comprising:
    associating the second plurality of data packets with the first data stream if the second GUID matches the first GUID.

4. The computer-implemented method of claim 3, wherein the first plurality of data packets correspond with a first internet protocol (IP) address and the second plurality of data packets correspond with a second IP address different from the first IP address.

5. The computer-implemented method of claim 1, wherein the first plurality of data packets and the second plurality of data packets are associated with a same connection to the remote device if the second GUID matches the first GUID.

6. The computer-implemented method of claim 5, wherein the second plurality of data packets are received from the remote device over a different connection path than that of the first plurality of data packets.

7. The computer-implemented method of claim 1, wherein the first plurality of data packets and the second plurality of data packets are associated with different connections to the remote device if the second GUID is different from the first GUID.

8. The computer-implemented method of claim 1, wherein the second plurality of data packets is associated with the first data stream irrespective of the first plurality of data packets and the second plurality of data packets being received over connection paths corresponding to different network addresses and different port binding information if the second GUID matches the first GUID.

9. A system for identifying one or more data streams, the system comprising:
 one or more processors; and
 a computer-readable medium comprising instructions stored therein, which when executed by the processors, cause the processors to perform operations comprising:
  generating a first globally-unique identifier (GUID), wherein the first GUID comprises a plurality of pseudo-randomly generated bits;
  associating the first GUID with a first data stream comprising a first plurality of data packets;
  sending each of the first plurality of data packets to a remote device;
  receiving a second plurality of data packets from the remote device, wherein each of the second plurality of data packets comprises a second GUID;
  comparing the second GUID with the first GUID to determine if the second plurality of data packets is associated with the first data stream; and
  associating the second plurality of data packets with a second data stream, different from the first data stream, if the second GUID is different from the first GUID.

10. The system of claim 9, wherein the processors are further configured to perform operations comprising:
 associating the second plurality of data packets with the first data stream if the second GUID matches the first GUID.

11. The system of claim 10, wherein the first plurality of data packets correspond with a first internet protocol (IP) address and the second plurality of data packets correspond with a second IP address different from the first IP address.

12. The system of claim 9, wherein the first plurality of data packets and the second plurality of data packets are associated with a same connection to the remote device if the second GUID matches the first GUID.

13. The system of claim 12, wherein the second plurality of data packets are received from the remote device over a different connection path than that of the first plurality of data packets.

14. The system of claim 9, wherein the first plurality of data packets and the second plurality of data packets are associated with different connections to the remote device if the second GUID is different from the first GUID.

15. A computer-readable storage medium comprising instructions stored therein, which when executed by a processor, cause the processor to perform operations comprising:
 generating a first globally-unique identifier (GUID), wherein the first GUID comprises a plurality of pseudo-randomly generated bits;
 associating the first GUID with a first data stream comprising a first plurality of packets;
 sending each of the first plurality of data packets to a remote device using a quick UDP Internet connection protocol (QUIC);
 receiving a second plurality of data packets from the remote device, wherein each of the second plurality of data packets comprises a second GUID; and
 comparing the second GUID with the first GUID to determine if the second plurality of data packets is associated with the first data stream; and
 associating the second plurality of data packets with a second data stream, different from the first data stream, if the second GUID is different from the first GUID.

16. The computer-readable storage medium of claim 15, the operations further comprising:
 associating the second plurality of data packets with the first data stream if the second GUID matches the first GUID.

17. The computer-readable storage medium of claim 16, wherein the first plurality of data packets correspond with a first internet protocol (IP) address and the second plurality of data packets correspond with a second IP address different from the first IP address.

18. The computer-readable storage medium of claim 15, wherein the first plurality of data packets and the second plurality of data packets are associated with a same connection to the remote device if the second GUID matches the first GUID.

19. The computer-readable storage medium of claim 18, wherein the second plurality of data packets are received from the remote device over a different connection path than that of the first plurality of data packets.

20. The computer-readable storage medium of claim 15, wherein the first plurality of data packets and the second plurality of data packets are associated with different connections to the remote device if the second GUID is different from the first GUID.

* * * * *